United States Patent Office 3,124,429
Patented Mar. 10, 1964

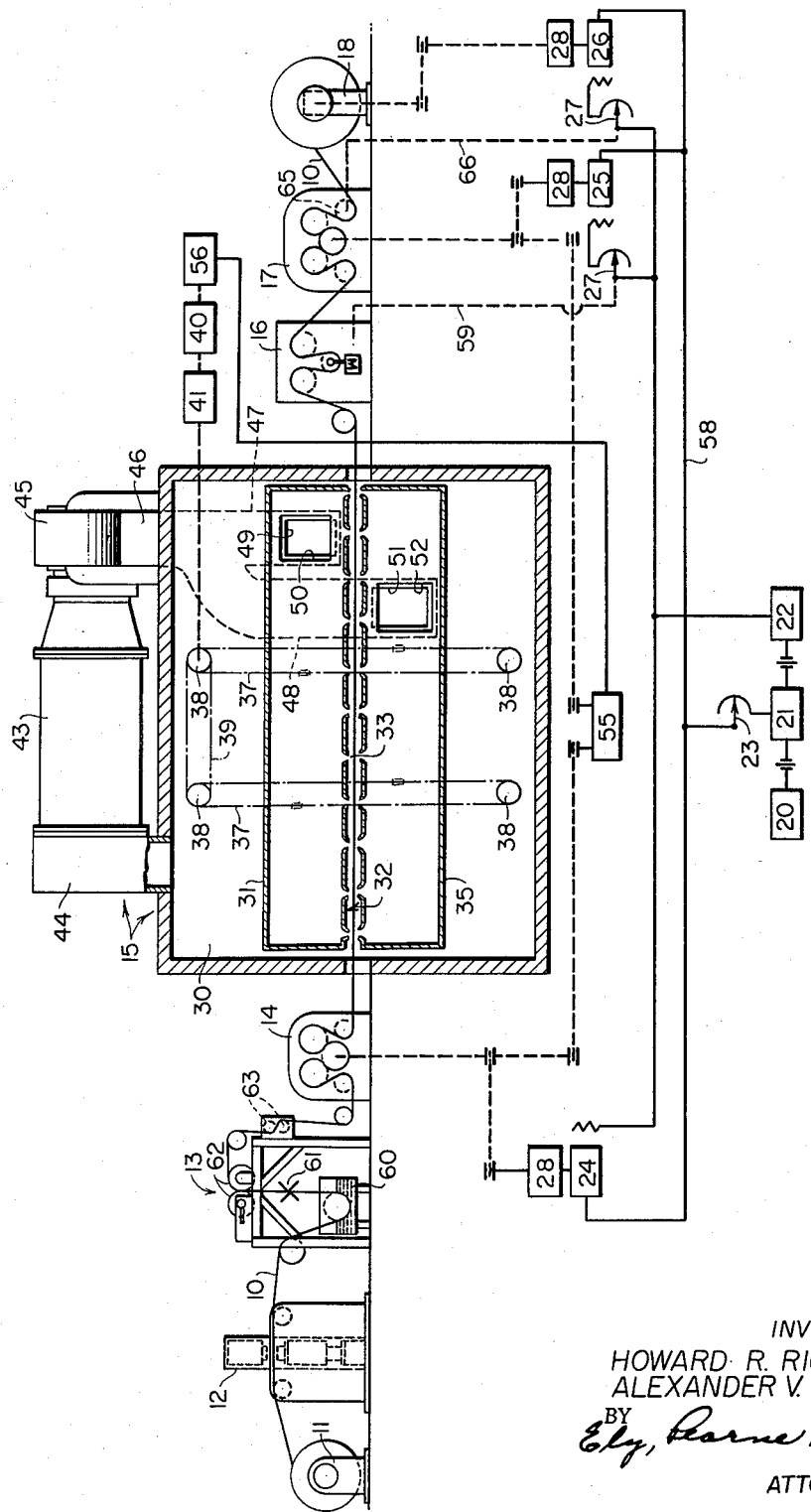

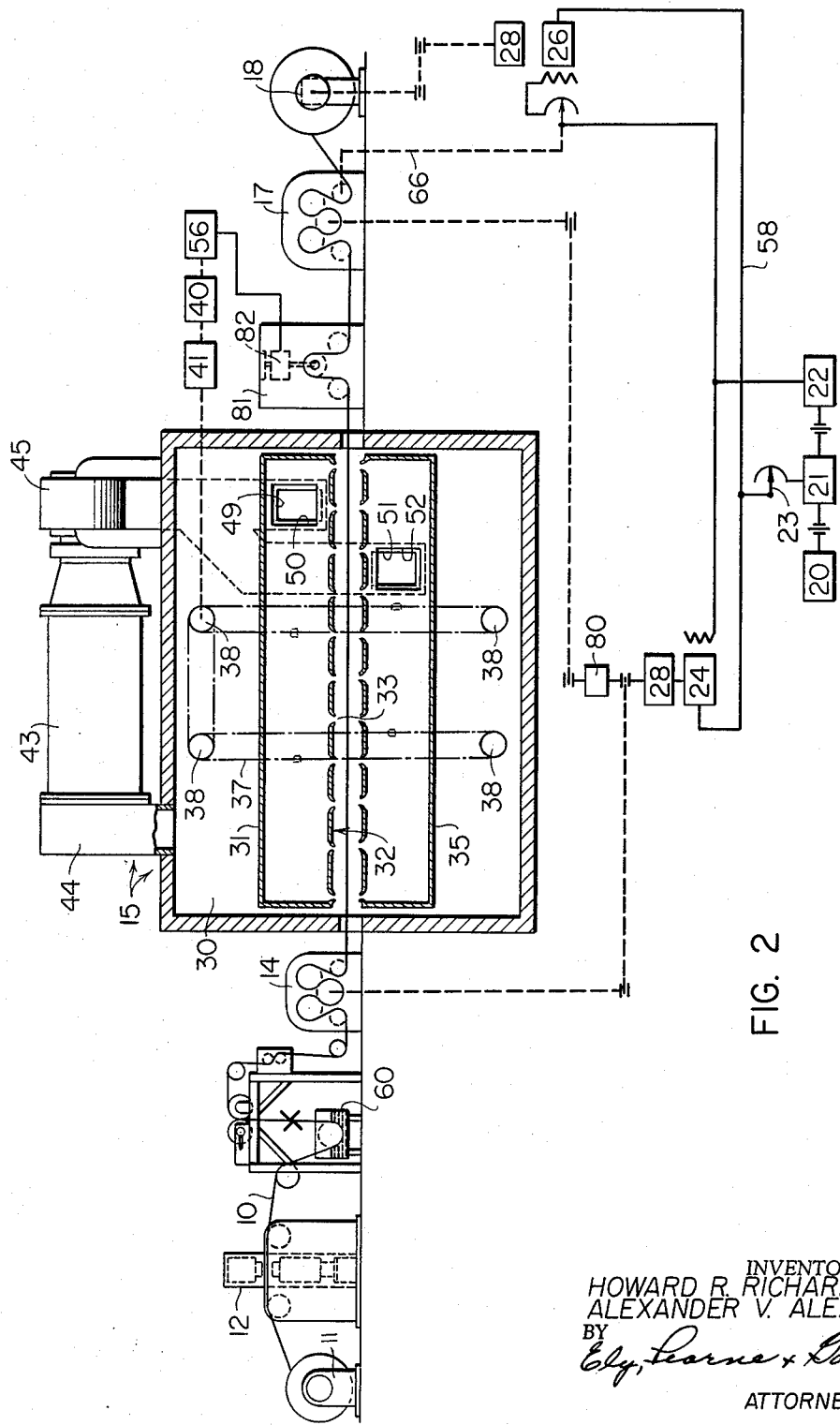

3,124,429
WEB AND STRAND TREATING APPARATUS
Alexander V. Alexeff, Cleveland, and Howard R. Richards, Lakewood, Ohio, assignors to Industrial Ovens, Incorporated, Cleveland, Ohio, a corporation of Ohio
Filed Feb. 21, 1958, Ser. No. 716,791
5 Claims. (Cl. 34—48)

The present invention relates to heat treatment of webs and strands and particularly to method and apparatus for attaining very precise and responsive temperature control of the treated material. For purposes of this application "strands" is to be understood to include monofilaments such as nylon, rayon, and glass fiber as well as wires, cords, narrow tapes and tubings, and "strips" is to be understood to include strands and also webs such as metal sheet, paper, textiles, films and wide tapes.

In numerous present-day continuous or semi-continuous processes for the heat treatment of strip, it is desirable to maintain a high degree of uniformity of treatment of the strip from increment to increment of its length. This is particularly desirable where the treatment can be wholly satisfactory only when carried out within narrow critical ranges of conditions.

A purpose of the present invention is to control heat input into a strip in such a manner as to achieve a high degree of uniformity of treatment from increment to increment of strip length.

Another purpose of the invention is to provide a heating means for heating a strip at a controllable and variable rate and which can be controlled, either manually or automatically, in a highly responsive manner.

It is to be understood that although the controls and the particular heating means described herein presently appear to be ideally suited to each other and to the optimum practice of the invention, nevertheless some of the advantages of the controls contemplated by the invention may be realized when other heating means are used, such as the variable length ovens shown in the copending patent application of Alexander V. Alexeff, Edwin P. Homburg and Howard Richards, Serial No. 456,691, filed September 17, 1954, now U.S. Patent 2,837,834. Similarly, some advantages of the heating means contemplated by the invention may be realized without using the controls contemplated by the invention. For example, as previously mentioned, the heating means may be merely manually controlled in certain applications where the high responsiveness of the heating means would still be a definite advantage.

Accordingly, it will be clear that the invention may be embodied either in the heating means alone or in the control means alone, or in both together.

The objects and advantages of the invention will become apparent from the following description of specific embodiments of the invention. As will be apparent to those familiar with web or strand processing, specific mechanical, electrical or hydraulic equipment components to be employed in any given installation are a matter of choice within the routine skill of the art. Suitable components in each illustrated embodiment are, therefore, illustrated schematically in the interest of clarity in order that the invention itself may be most concisely and completely disclosed and understood.

In the drawings:

FIGURE 1 is a partly schematic and partly diagrammatic illustration of a semi-continuous web processing system employing the invention.

FIGURE 2 is a similar illustration of another embodiment of the invention in a semi-continuous web processing system.

FIGURE 1 illustrates a semi-continuous installation in which the invention is employed. The illustrated installation might be employed for dipping a web in a bath, the web then being heated, dried, and simultaneously stretched under considerable tension. In such "hot stretching" it is frequently desirable to maintain conditions as constant as possible from increment to increment of the web length in order to be able to maintain as closely as possible ideal conditions of treatment or in order to approach as closely as possible upper critical limits, such as the upper temperature limits which, if reached, will damage the material but which it is desirable to approach as closely as possible to effect best results. In the illustration the web is indicated by the reference numeral 10.

The main components of the installation shown in FIGURE 1 comprise a let off stand 11, a splice press 12, a dip station 13, a first high-tension-capacity pull roll stand 14, heating means indicated generally by the reference numeral 15, a dancer roll length-sensing stand 16, a second high-tension-capacity pull roll stand 17, and a wind up stand 18.

The installation may employ, in any conventional manner, a plurality of variable speed D.C. motors as a power and control means for the several web driving members. The power and control system may comprise a motor 20, a generator 21, a field exciter 22, an overriding or governing speed control rheostat 23, and a plurality of voltage responsive, variable speed D.C. motors 24, 25 and 26, each of these motors with the exception of the motor 24 being provided with its own subsidiary speed control means, such as field voltage rheostats 27, such speed control means being responsive to variation in length between several points in the system as explained below. A speed reducer 28 is associated with each of the motors 26–26.

The heating means, according to one aspect of the present invention, comprises a chamber 30 through which the web 10 reaches. At least one duct 31 extends along such reach of the web 10 and has a face 32 in apposition to such reach. Gas emitting outlets 33 are provided in such face. In the particular apparatus shown, the upper duct 31 is duplicated by a lower duct 35 which is similar in all respects to the upper duct but which extends along the opposite side of such reach of the web 10 within the chamber 30.

There is provided means to translate the ducts 31 and 35 within the chamber 30 toward and away from such reach of the web 10 to vary the distance of the apposite faces of the ducts 31 and 35 from such reach. For this purpose, the ducts 31 and 35 may be hung from or coupled with endless cables or chains 37. Each cable or chain passes around associated sprockets or sheaves 38 which are coupled together by a secondary chain and sprocket linkage 39 and which are powered by a reversible motor 40 through a speed reducer 41. It will, of course, be understood that other equivalent mechanisms may be employed to shift the duct or ducts, the choice of the most desirable mechanism being a matter of mechanical expediency in the particular circumstances and conditions.

As a part of the heating means 15, there is provided an air heater 43 of any suitable conventional type. There is also provided means to guide air for circulation from the chamber 30 through the heater 43 and to the duct 31, and also to the duct 35 where two ducts are employed as in the illustrated apparatus. This means includes an exhust duct 44, a blower 45, an input duct 46 leading from the blower and branch ducts 47 and 48, the latter being employed only when two moving ducts are furnished. The ducts 47 and 48 extend down the side wall of the chamber 30. The duct 47 has a port 49 opening into the chamber 30. This port 49 communicates with a port 50 formed in the side of the moving duct 31. Ports 51 and 52 are similarly associated with the duct 48 and moving duct 35, respectively. It will thus be seen that air emitted from the gas emitting openings 33 (and from the similar openings associated with the duct 35 if two moving ducts are employed) is recirculated through the heater 43 back through the gas emitting openings. The rate of heating of the web can be very quickly varied by activating the means to translate the moving duct or ducts, such means in the illustrated case comprising the motor 40, speed reducer 41, and sheaves, cables and associated drive means 37–39.

It should be understood that a significant advantage of the illustrated variable heating means is that even with other variables (such as air temperature and volume of air translation) remaining constant, nevertheless the absolute heat input to the web 10 can be considerably varied at a constant web speed by moving the ducts toward and away from the web to vary the relative velocity between the web and the hot air emitted from the duct or ducts 31 and 35. This relative velocity is higher as the duct or ducts are moved closer to the web and therefore there occurs quick variation of the coefficient of heat transfer between the gas and the surface.

In the illustrated example of the invention, a speed differential sensor 55 which may comprise a conventional D.C. tachometer bridge is provided to sense the difference in speed between the drives at the tension stands 14 and 17. This is a direct measure of stretch occurring between these stands. Through a suitable and conventional control potentiometer 56, the motor 40 is controlled in response to sensed speed differences between the drive rolls of the stand 14 and 17 so that upon increase in speed of the output stand 17 over a value represented by the speed of the input stand 14 plus a constant (such constant representing the desired degree of stretch) the duct or ducts associated with the heating means are moved away from the web to decrease heat input, and upon decrease in speed of the output stand 17 below the value represented by the speed of the input stand 14 plus such constant, the duct or ducts are moved toward the web to increase heat input.

The overall speed of the processing line shown in FIGURE 1 is governed by the pull rolls 14. It will be seen that the speed of the motor 24 associated with these pull rolls is governed directly by the overriding control rheostat 23, there being no ancillary variable control for field voltage in this motor 24. As a consequence, variation of the armature voltage for this motor correspondingly varies armature voltage in the other drive motors 25 and 26 to the common armature voltage line 58.

When the web processing line is running under normal conditions, a relatively low tension is maintained between the let off stand 11 and the pull roll or drive stand 14 by simple brake friction on the let off stand. Between the drive stand 14 and the drive stand 17 a tension (which in many applications will be a relatively high tension of several thousand pounds or even more) is maintained by the weight W on the dancer roll associated with the dancer roll stand 16 which imposes a constant force in tension on the web. The vertical position of the lower member or weight W of the dancer roll stand 16 controls the associated rheostat 27 through a linkage 59. Thus, if the member W, associated with the stand 16, tends to drop, the rheostat is automatically adjusted through the linkage 59 to cause the motor 25 to speed up which, in turn, tends to take up material between the stands 14 and 17 causing the member W to move upward. Conversely, if the member W tends to rise, the motor 25 slows. Thus, a feedback or self-governing control maintains a constant length of web between the pull roll stands 14 and 17.

Through a tension sensing element 65 and a suitable linkage 66 associated with the stand 17, the motor 26 is controlled to maintain the desired web length between the drive stand 17 and the take up stand 18, as indicated in FIGURE 1.

During passage from the let off stand or roll 11 to the drive stand 14, the webbing is illustrated as being processed at the dipping station 13, the web being dipped into a coating liquid 60, then passed between scraper bars 61, squeegee rolls 62 and beater bars 63.

When the line is operating at speed as determined by the overriding rheostat 23, the tension between the drive stands 14 and 17, or in other words the tension of the web in the reach going through the chamber 30, is maintained constant by the weight imposed by the member W at the dancer roll stand 16. The heat input of the heating member 15 is controlled to counteract the tendency of the amount of stretch to vary through the differential sensor 55 and control potentiometer 56. In this respect, it will be clear that the amount by which the speed of the pull roll 17 exceeds that of the pull roll 14 is a measure of the stretch occurring between the pull roll stands 14 and 17.

Accordingly, it will be seen that the illustrated apparatus serves to hold tension at a constant and to control heat input into the web in response to stretch and in a manner to counteract any increase or decrease from the desired amount of stretch.

It will be apparent to those familiar with web or strand processing techniques and equipment that the particular electrical power and control means shown may be replaced by conventional mechanical or hydraulic apparatus or by other suitable alternative electrical means, and that the specific component shown may be varied as a matter of expediency to meet particular requirements.

FIGURE 2 illustrates another semi-continuous installation in which the invention is employed. Again, the installation might be employed for dipping a web in a bath and then hot stretching the web. Elements which are like those shown in FIGURE 1 are given like reference numerals.

In the apparatus shown in FIGURE 2 the overriding or speed control rheostat 23 governs the speed of the motors 24 and 26. However, the motor 25 is eliminated and there is a positive relationship between the drives of the stands 14 and 17, the stand 17 being driven at a slightly greater speed than the stand 14, as indicated schematically by the intervening fractional speed changer 80. Since the strands 14 and 17 are positively interconnected to maintain a definite speed difference, the amount of stretch occurring between them remains a constant.

The dancer stand 16, which is in effect a length sensing stand, is replaced by the dancer stand 81 which is in effect a tension sensing stand. The dancer roll in the stand 81 is not free to move up and down but acts only to impose different stresses on a standard load cell or tension sensing cell 82 which, in turn, supplies its output voltage (which varies directly with imposed stress) to the control potentiometer 56. Accordingly, the heat input of the heating means 15, as determined by the position of the ducts 31 and 35, is governed in response to the tension of the web 10 in the reach passing through the chamber 30. As the tension increases from the desired value, the control potentiometer 56 causes the motor 40 to move the duct toward the web 10 thereby increasing heat input and decreasing tension, stretch being held at a constant. As the tension is decreased from the desired value, the control potentiometer 56 causes the motors to operate to move the ducts 31 and 35 away from the web 10 tending to decrease heat input and therefore increase tension. Accordingly, it will be seen that in the embodiment of FIGURE 2, stretch is maintained at a constant and the tension in the web within the chamber 30 controls the amount of heat input to the web 30.

While the above disclosure and claims generally refer to air heating means and to treating by hot air, it will be understood that the invention is applicable to heat treatment by other gases and in fact to other fluid treatment procedures other than heat treatment where an agent other than heat (for example, moisture, or a solvent for the strip material) is imposed on a strip and is of such character as to tend to decrease the tension of the strip and increase the length of the strip. In this connection, the term "air" in the appended claims is to be understood to cover other gases which are equivalent to air for the purposes of this application.

The above discussion of the invention should make it apparent that the invention may be embodied in many different specific strip processing set-ups. The disclosure of the invention will suggest to the art many possibilities for specific installations which are especially designed to meet particular conditions and operating requirements. The scope of the invention is therefore not to be limited to details of the embodiments disclosed above but is to be defined by the claims set forth below.

What is claimed is:

1. In continuous and semi-continuous strip treating apparatus for heating a strip to a desired temperature and simultaneously stretching said strip to a desired degree, heating means for heating a strip at a controllable and variable rate, means to feed said strip through said heating means, measuring means for measuring the stretch occurring in the strip being fed, means responsive to said measuring means for varying the heating rate of said variable-rate heating means as an inverse function of the amount by which stretch occurring during feeding of said strip through said heating means exceeds or falls short of said desired degree of stretching, and means for maintaining a constant tension on said strip in said heating means.

2. In continuous and semi-continuous strip treating apparatus, heating means for heating a strip at a controllable and variable rate, a feed-in drive for feeding said strip to said heating means, a feed-out drive for feeding said strip from said heating means at speeds exceeding that of said input drive, measuring means for measuring the speeds of said drives, means responsive to said measuring means for varying the heating rate of said variable-rate heating means as an inverse function of the amount by which the speed of said output drive exceeds or falls short of the speed of said input drive plus a constant, and means for maintaining a constant tension on said strip in said heating means.

3. Heat input means for heating a strip at a controllable and variable rate comprising a chamber through which said strip reaches, at least one duct in said chamber and extending along said reach of said strip and having a face in apposition to said reach, gas-emitting outlets on said face, an air heater, means to guide air for circulation from said chamber through said air heater and to said duct whereby air emitted from said gas-emitting openings is recirculated through said air heater, control responsive means for continuously translating said duct within said chamber toward and away from said reach to vary the distance of said face from said reach while said recirculation is occurring, whereby the rate of heating of said strip is continuously variable in closely responsive relationship to said continuous translation of said duct within said chamber.

4. In continuous and semi-continuous strip treating apparatus for subjecting a strip to a desired amount of a softening and stretch-promoting agent and simultaneously stretching said strip to a desired degree, means for treating a strip with a softening and stretch-promoting agent at a controllable and variable rate, means to feed said strip through said treating means, measuring means for measuring the stretch occurring in the strip being fed, means responsive to said measuring means for varying the treating rate of said variable-rate treating means as an inverse function of the amount by which stretch occurring during feeding of said strip through said treating means exceeds or falls short of said desired degree of stretching, and means for maintaining a constant tension on said strip in said treating means.

5. In continuous and semi-continuous strip treating apparatus, treating means for treating a strip with a softening and stretch-promoting agent at a controllable and variable rate, a feed-in drive for feeding said strip to said treating means, a feed-out drive for feeding said strip from said treating means at speeds exceeding that of said input drive, measuring means for measuring the speeds of said drives, means responsive to said measuring means for varying the treating rate of said variable-rate treating means as an inverse function of the amount by which the speed of said output drive exceeds or falls short of the speed of said input drive plus a constant, and means for maintaining a constant tension on said strip in said treating means.

References Cited in the file of this patent

UNITED STATES PATENTS

| | | |
|---|---|---|
| 285,954 | Barry | Oct. 3, 1883 |
| 508,993 | Smith | Nov. 21, 1893 |
| 636,174 | Pickles | Oct. 31, 1899 |
| 2,038,457 | Venturini | Apr. 21, 1936 |
| 2,409,431 | Hess | Oct. 15, 1946 |
| 2,420,399 | New | May 13, 1947 |
| 2,571,815 | Benoit et al. | Oct. 16, 1951 |
| 2,582,241 | Dungler | June 15, 1952 |
| 2,639,364 | Doyle | May 19, 1953 |
| 2,807,096 | Kullgren et al. | Sept. 24, 1957 |
| 2,807,097 | Kullgren et al. | Sept. 24, 1957 |
| 2,932,901 | Salem et al. | Apr. 19, 1960 |
| 2,952,078 | Litzler | Sept. 13, 1960 |
| 2,955,342 | Litzler et al. | Oct. 11, 1960 |